2 Sheets—Sheet 1.

C. McENTEE.
Scraper.

No. 222,637. Patented Dec. 16, 1879.

Attest.
Sidney P. Hollingsworth
Harry King.

Inventor:
Charles McEntee,
By his Attorneys,
Stansbury & Munn.

N. PETERS, PHOTO-LITHOGRAPHER, WASHINGTON, D.C.

2 Sheets—Sheet 2.

C. McENTEE.
Scraper.

No. 222,637. Patented Dec. 16, 1879.

Attest.
Sidney P. Hollingsworth
Harry King.

Inventor
Charles McEntee,
By his Attorneys,
Stansbury & Munn.

N. PETERS, PHOTO-LITHOGRAPHER, WASHINGTON, D. C.

UNITED STATES PATENT OFFICE.

CHARLES McENTEE, OF PLATTSMOUTH, NEBRASKA.

IMPROVEMENT IN SCRAPERS.

Specification forming part of Letters Patent No. 222,637, dated December 16, 1879; application filed April 12, 1879.

*To all whom it may concern:*

Be it known that I, CHARLES MCENTEE, of Plattsmouth, in the county of Cass and State of Nebraska, have invented certain new and useful Improvements in Excavator-Scrapers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
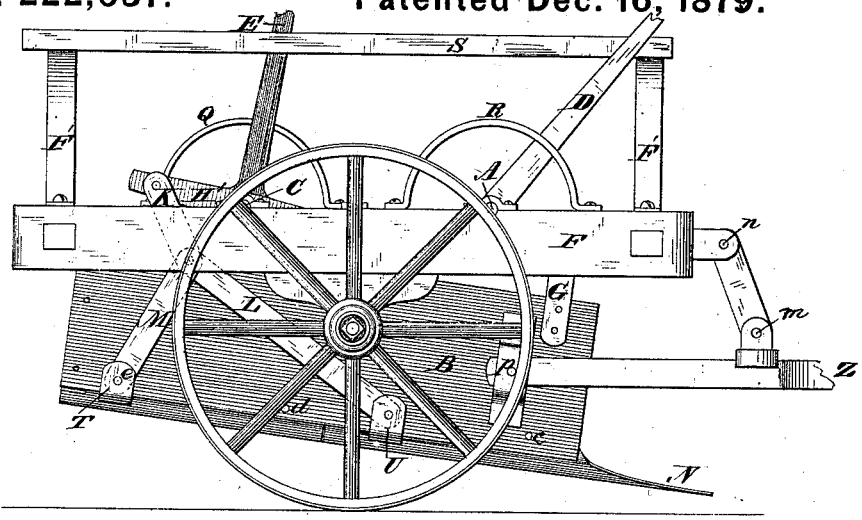
Figure 2:
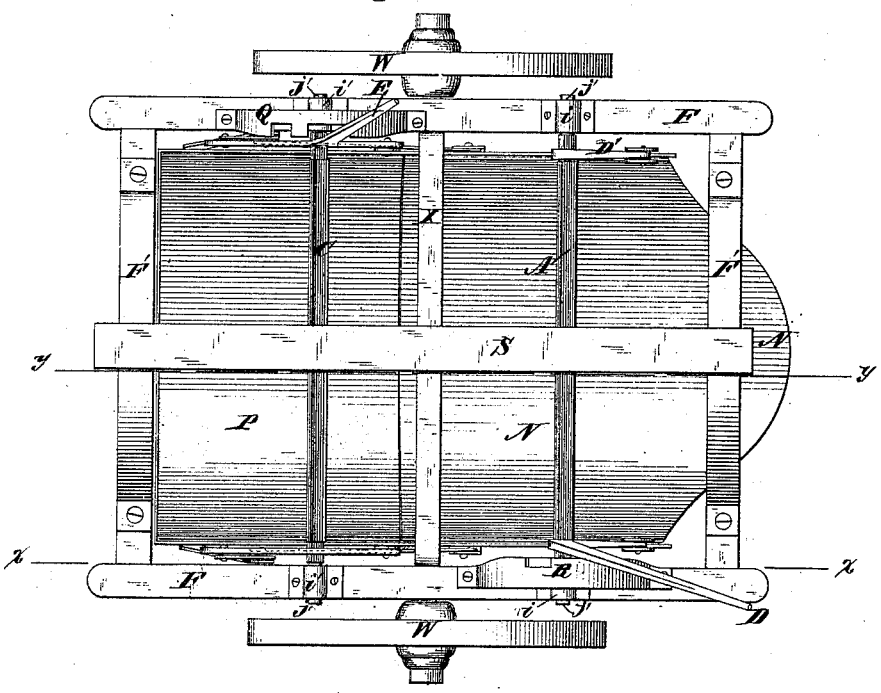
Figure 3:
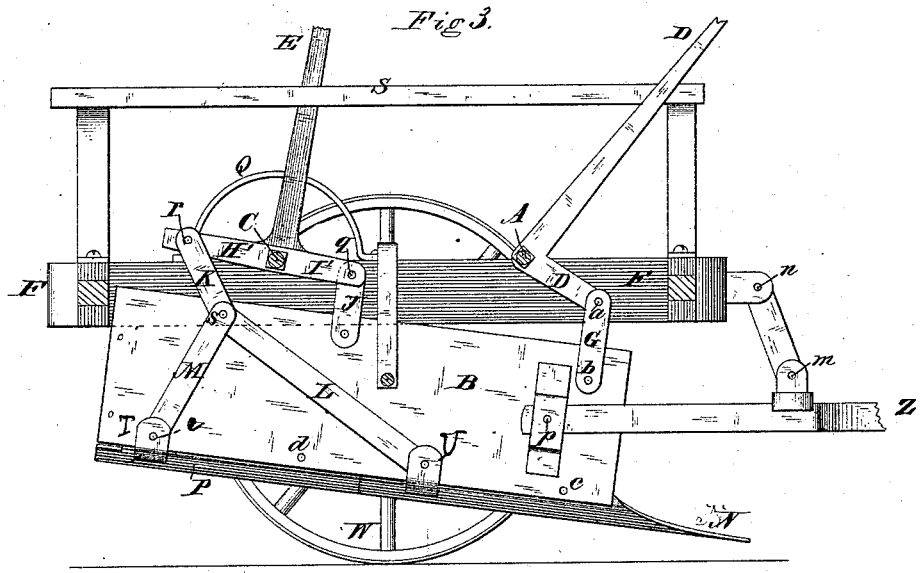
Figure 4:
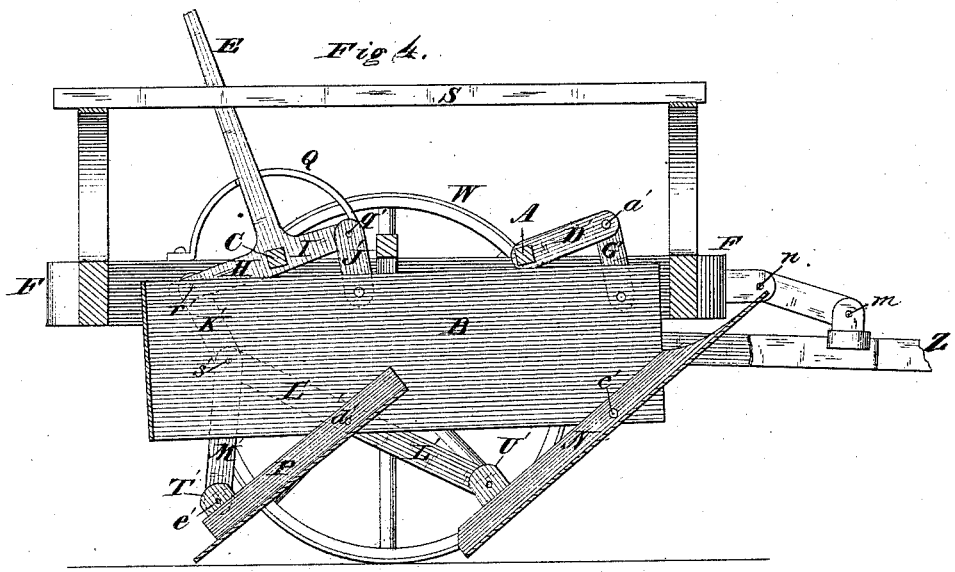

Figure 1 is a side elevation of the machine. Fig. 2 is a plan or top view. Fig. 3 is a vertical section on line $x\ x$ of Fig. 2. Fig. 4 is a similar section on line $y\ y$ of Fig. 2.

The same letter indicates the same part wherever it occurs in the drawings.

My invention and improvements relate to that class of excavators or road-scrapers which are suspended in frames placed upon wheels and drawn by horses, and are provided with devices for gathering, carrying, and dumping the earth or other material to be operated upon.

The invention consists in the peculiar construction of the machine, as hereinafter fully described, whereby the driver is enabled, by the use of two conveniently-placed levers, to apply the implement to the scraping or gathering of the earth, to raise the box to transport the collected material, and to discharge the same at will, the mechanism being simple, strong, and little liable to derangement.

In the drawings, F marks a stout frame, suspended to the axle X of the wheels W W. Braces F', attached to the front and rear cross-framing, support the seat S, upon which the driver of the implement is supported. The horses which draw the machine are attached to a tongue, Z, pivoted at $p$ and $m\ n$ to the box B and frame F.

Across the frame pass transversely the rock-shafts A C, whose journals $j'\ j'$ turn in boxes $i\ i'$ attached to the top of the frame, as shown in Fig. 2. To shaft A is attached, at one end, bent lever D, whose lower end is pivoted at $a$ to a lug, G, attached to the side of the scraper-box B. To the opposite end of shaft A is fixed an arm, D', pivoted at $a'$ to lug G', attached to the opposite side of box B.

To one end of shaft C is attached lever E, placed on the opposite side of the driver's seat to lever D. This lever has two arms, H I, projecting at right angles from its fixed end, and arms H' I', corresponding in length and position to those, are attached to the opposite end of shaft C. The forward arms, I I', are pivoted at $q\ q'$ to lugs J J', attached to the sides of box B. The rear arms, H H', are pivoted at $r\ r'$ to link-bars K K', and at $s\ s'$ to bars L L' M M'. Bars M M' are pivoted at $e\ e'$ to lugs T T' on the rear section, P, of the scraper-box bottom, and bars L L' to lugs U U' on the forward plate or section, N, of said bottom.

The lever D engages with notches in an arched rack, R, attached to one side of the frame, and lever E engages with a similar rack, Q, fixed to the opposite side of the frame. The racks hold the levers in any desired position at the will of the driver.

The scraper-box B consists of a back and two sides and the movable bottom-plates N P. The sides I prefer to make of iron, and the bottom plates of steel. These last are pivoted, respectively, at $c\ c'$ and $d\ d'$, to the sides of the box B, so as to be capable of a tilting movement.

The box, it will be observed, is suspended by the four lugs G G' J J' to the arms I I' D D' of the levers D E and rock-shafts A C.

It results from the described construction that when both levers are thrown forward, as in Figs. 1 and 3, the scraper-box assumes its lowest position, and is inclined forward, so that the front plate, N, is in the proper position to do the work of scraping or excavation.

When the forward lever, D, is drawn back the box is raised, and the implement becomes a cart for the transportation of the gathered material. If, now, the rear lever, E, be drawn back, the plates P and N are depressed at their rear margins by the operation of the link-bars K L M K' L' M', and the contents of the box will be discharged.

The position of the parts when discharging the load is clearly shown in Fig. 4.

What I claim is—

1. The scraper-box suspended to the arms D D' I I', in combination with the levers D E, for raising and lowering the same, as described.

2. The rock-shaft A, provided with the lever D and arm D', pivoted to lugs G G' on the scraper-box, in combination with rock-shaft C, having lever E and arms I I', pivoted to lugs J J' on said scraper-box, all as and for the purpose specified.

In testimony that I claim the foregoing as my own I affix my signature in presence of two witnesses.

CHARLES McENTEE.

Witnesses:
SAM. M. CHAPMAN,
HARRISON C. BROWN.